United States Patent

[11] 3,612,689

[72] Inventor John W. Liskowitz
Belle Meade, N.J.
[21] Appl. No. 775,093
[22] Filed Nov. 12, 1968
[45] Patented Oct. 12, 1971
[73] Assignee American Standard Inc.
New York, N.Y.
Continuation-in-part of application Ser. No. 629,568, Apr. 10, 1967.

[54] SUSPENDED PARTICLE CONCENTRATION DETERMINATION USING POLARIZED LIGHT
20 Claims, 5 Drawing Figs.
[52] U.S. Cl. .................................................. 356/103, 356/114
[51] Int. Cl. ...................................................... G01n 21/00

[50] Field of Search ............................................ 356/114–116
102–104, 210

[56] References Cited
UNITED STATES PATENTS
2,788,702  4/1957  Baum, Jr. ..................... 356/103
3,283,644  9/1966  Saltzman ..................... 356/116

Primary Examiner—Ronald L. Wibert
Assistant Examiner—Conrad Clark
Attorneys—Sheldon H. Parker and Robert G. Crooks ABSTRACT: Particles suspended in a fluid are detected by directing an incident beam of polarized light at the particles and determining the relationship between the depolarized and polarized components of the light which is scattered by the particles. The angle between the scattered light and the incident light is preferably greater than 150°.

FIG.2 Dependence of the Degree of Depolarization Upon Concentration

SUSPENDED PARTICLE CONCENTRATION DETERMINATION USING POLARIZED LIGHT

CROSS-REFERENCE TO RELATED APPLICATIONS

This application is a continuation-in-part of the U.S. Pat. application Ser. No. 629,568, filed Apr. 10, 1967.

BACKGROUND OF THE INVENTION

1. Field of the Invention this invention relates to the measuring of the concentration of particles suspended in a fluid, and more particularly to the measuring of the degree to which polarized light is depolarized when it is scattered by the particles in the fluid as the means for determining the solid particle concentration.

2. Description of the Prior Art

It is known, for example, that suspended matter in water can be determined by its optical techniques such as light absorption and light scattering techniques. Instruments have been developed for the measurement of turbidity by measuring the light scattered at a definite angle to the incident light, such as 35°, 45°, 68°, or 90°. It has been found to be difficult to correlate particle concentrations as weight of suspended matter to the amount of light scattered in one direction in cases in which the particles vary in shape and/or size, because of the dependency of the measurement system upon particle size and shape. Variations in the intensity of the light source also tend to affect the measurements and therefore very stable required. The use of an integrating sphere type of instrument which measures the total amount of light scattered in all directions has been used in order to eliminate the dependency of the system upon particle size and shape.

The depolarization measurements have been used primarily to determine the size and anisotropy of scattered particles. This normally requires that the concentrations of the solute be varied so that extrapolations to infinite dilution can be achieved. In this manner, secondary or multiple scattering which will interfere with these measurements is eliminated.

SUMMARY OF THE INVENTION

By way of contrast, it has now been found that measuring the degree of depolarization of light which has undergone secondary or multiple scattering can be used to determine the concentration of suspended solids.

In accordance with the present invention, polarized light is transmitted through the fluid being analyzed, and the intensity of light which has its optical axis normal to that of the polarized light and which has been scattered in a backward direction, is measured and compared with the intensity of light which has its optical axis parallel to that of the polarized light and which has been scattered in the aforesaid direction. The ratio of the intensity of the normal polarity light to the parallel polarity light represents the degree of depolarization of the scattered light, and the concentration of solids in the fluid is proportional to the degree of polarization.

BRIEF DESCRIPTION OF THE DRAWING the objects and advantages of the invention will become evident, and the invention will be more fully understood, from the following description when read in conjunction with the drawings wherein.

DESCRIPTION OF THE PREFERRED EMBODIMENTS

Figure 1:
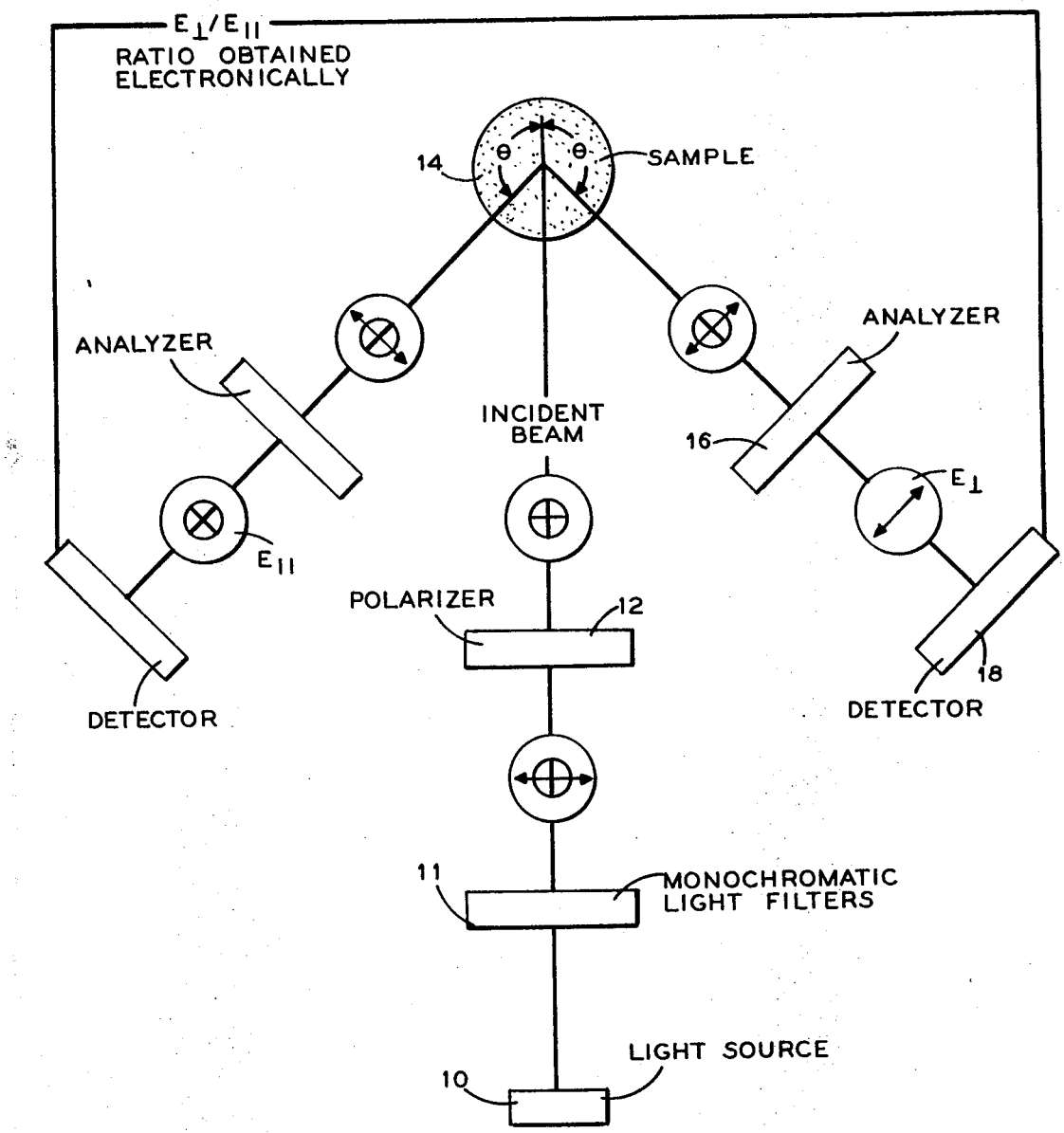
FIG. 1 is a schematic representation of an apparatus in accordance with the present invention.

As shown in FIG. 1, a source of light 10, such as a mercury lamp, or a tungsten or xenon lamp, depending upon the desired wavelength, is polarized by means of a conventional polarizer 12. The light source may be one which produces only a desired wavelength or filters 11 can be used to restrict the light to monochromatic light.

It should be understood that the monochromatic light filter can be positioned anywhere between the light source and the detector. In a system which employs a pair of analyzers and detectors, it is obviously most advantageous to employ the filter between the light source and the sample rather than between the sample and the detector because, in the former case, only a single filter unit is required, whereas in the latter case, a pair of equivalent units is required. Differences in the light transmission characteristics in the two filter units will introduce errors into the system.

While the use of monochromatic light is preferred, polychromatic light can be used without filtering. If light of multiple wavelengths is used however, the maximum repeated, should be comparable in length to the diameter of the particles being measured in order to produce the best results.

The beam of the polarized light passes through the sample 14, and is scattering in many directions due to primary as well as repeated, or multiple, scattering of the solid particles suspended in the sample. An analyzer 16, and a detector 18, are positioned so as to receive light scattered in a backward direction, at a particular angle and in a plane which is defined by a direction of the incident and scattered light and is approximately perpendicular to the plane of polarization of the incident radiation.

The angle $\theta$ between the path of the transmitted light and the path of the scattered light will hereinafter, for convenience, be referred to as the observation angle.

Figure 2:
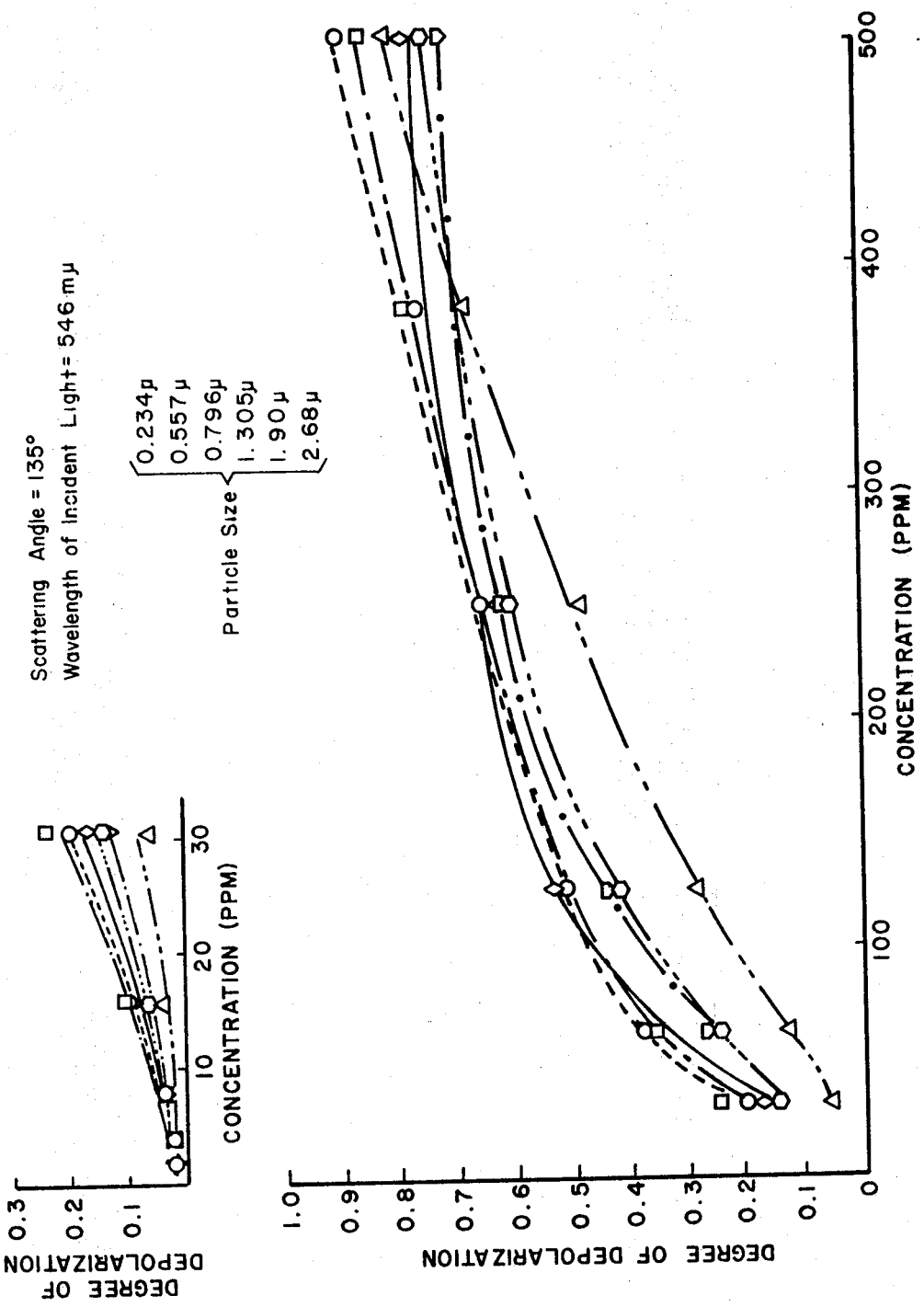
FIG. 2 is a graph which shows the dependence of the degree of depolarization upon concentration, using a scattering angle of 135°.

FIG. 2 shows a curve for a typical system in which the degree of depolarization is plotted against the concentration of suspended solid particles in a fluid. The concentration of particles of 234 millimicrons (m$\mu$), 557 m$\mu$, 796 m$\mu$, 1,305 m$\mu$, 1,900 m$\mu$, and 2,680 m$\mu$ was varied from 2 parts per million p.p.m. to 500 p.p.m. Water was the fluid employed and the wavelength of the light was selected as 546 m$\mu$, through the use of monochromatic light filters.

The angle $\theta$ was set at 135°. The determination of $E_\perp$ was made by setting the analyzer so that its optical axis was perpendicular to the axis of the polarized light. The intensity of the depolarized light was thus determinable, since the intensity of the light reaching the detector was equal to one-half that of the depolarized light.

In order to avoid any errors which can result from having the angle $\theta$ differ between the $E_\perp$ and $E_{||}$ determinations, and rather than using two separate analyzers and detectors, after a reading for $E_\perp$ was obtained, the analyzer 16 was rotated 90° about an axis perpendicular to its optical axis, thus making its optical axis parallel to the axis of the polarized light.

Figure 4:
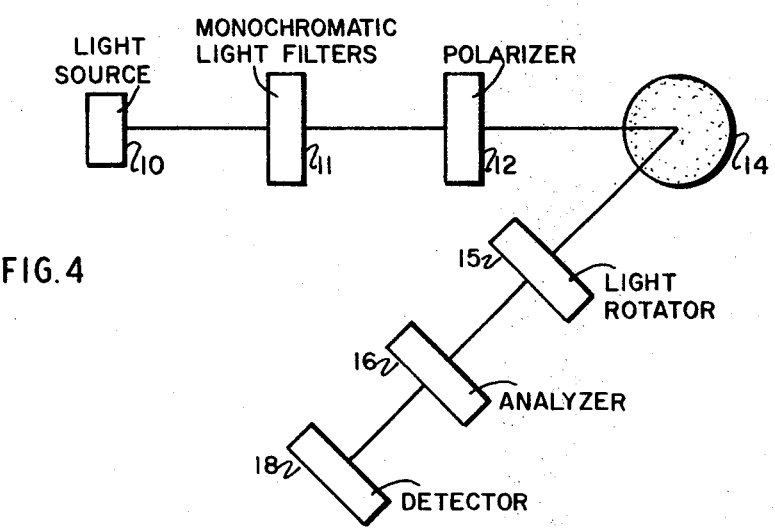
FIG. 4 is a schematic representation of another modification of an apparatus for use in the present invention.

Alternatively, as illustrated in FIG. 4, a member 15 which rotates the plane of the light 90°, such as quartz crystal, can be mounted for rotation between the analyzer 16 and the sample 14, or can be mounted for movement into and out of the path of the light at a position between the sample 14 and the analyzer 16. In the latter case, when the light-rotating device is out of the path of the light, an equivalent, though nonrotating member, such as a fused quartz plate, should be placed in the path of the light so that the light transmission characteristics will remain constant.

The ratio of the intensities $\frac{E_\perp}{E_{||}}$ represents the depolarization of scattered light. Obviously, other ratios can be used. Basically, the quantities which are measured directly are:

1. the intensity of the component of light having its optical axis parallel to the axis of the polarized light ($E_{||}$)
2. the intensity of the component of light having its optical axis perpendicular to the axis of the polarized light ($E_\perp$)
3. the intensity of the total light ($E_T$)

$$E_{||} = E_p + \frac{E_d}{2} \qquad E_\perp = \frac{E_d}{2}$$

$E_T = E_p + E_d$ wherein:
- $E_p$ = intensity of polarized light
- $E_d$ = intensity of depolarized light
- $E_T$ = intensity of total light.

Figure 3:
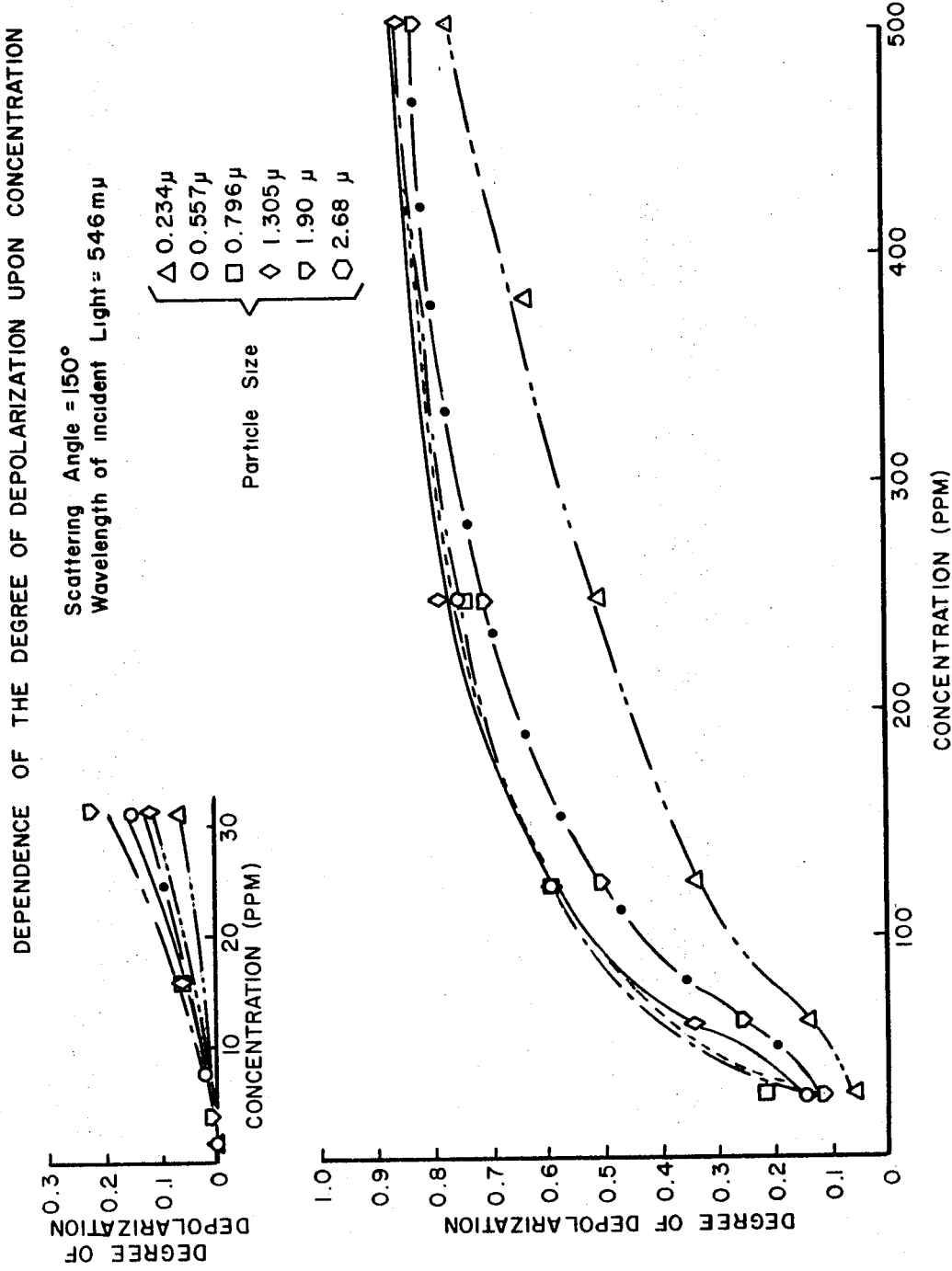
FIG. 3 is a graph as in FIG. 2, but using a scattering angle of 150°.

It is noted in FIG. 2, that the lines of the particles having a size at least comparable to the length of the wavelength of the light fall quite close together. From FIG. 3, it becomes evident that increasing the angle $\theta$ to 150°, further serves to bring together the lines for the particles having a size at least on the order of the wavelength of the incident light.

The benefit derived from using a large angle $\theta$ results from the fact that the portion of light which has undergone multiple scattering increases relative to the portion of light which undergoes primary scattering as the observation angle $\theta$ increases from 0° to 180°.

Inasmuch as the effects of particle size and shape on the apparent degree of depolarization can be substantially eliminated or at least minimized by viewing multiple-scattered light rather than primary-scattered scattered light, the observation angle should approach 180°, as an optimum. The angle should at least be greater than 90° so that the light viewed is backward scattered from the particles in the fluid. Preferably the angle should be greater than 135° in order to get a major degree of benefit from the aforementioned effect as seen in FIG. 2, while at angles greater than 150°, optimum conditions are approached.

It has been found also that if netural density filters were placed in from the light source, the degree of depolarization of the scattered light was not affected, even in cases whereby the intensity of the light source was varied by a factor 10. This provides a major benefit when a single analyzer and detector is used because the accumulation of solid material on the inner surface of the chamber or receptacle containing the fluid being analyzed will not influence the measurement of the degree of depolarization of the scattered light. A further disadvantage in using two separate analyzers and detectors exists because detectors will vary somewhat in their sensitivity and thus inherent differences between detectors can add errors to the determinations.

Figure 5:
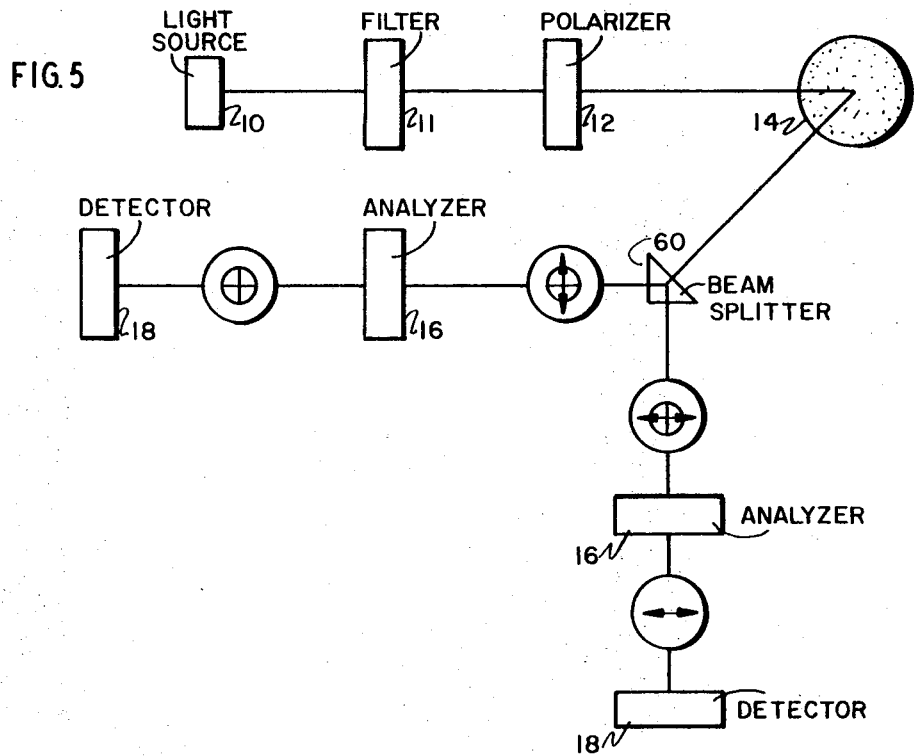
FIG. 5 is a schematic representation of a further modification of an apparatus.

The problem of the angle $\theta$ for the $E_\perp$ detection system differing slightly from the angle $\theta$ for the $E_\parallel$ detection can be eliminated by using a beam splitter 60, as shown in FIG. 5. While the beam splitter provides simultaneous readings without introducing errors due to nonsymmetry, it has the disadvantage of decreasing the intensity of the light reaching each of the detectors.

While for convenience, reference is made to solid particles in a fluid, it should be understood that determinations can be made with respect to any turbid medium in which coherent particles, liquid, solid, or even gas bubbles are suspended in a fluid or vacuum, provided there is a difference between the refractive index of the particles and that of the fluid.

The term turbine medium refers to a system which scatters light radiation to some extent. Typically, the fluid contains particulate matter having a refractive index different from that of the fluid, therefore causing radiation to be scattered.

Although the invention has been described in its preferred forms with a certain degree of particularity, it is understood that the present disclosure of the preferred forms has been made only by way of example, and that numerous changes in the details of construction and the combination and arrangement of parts may be resorted to without departing from the spirit and the scope of the invention.

GLOSSARY OF TERMS

Back scattering: The phenomenon of light having its direction of travel changed by more than 90° from the direction of travel of the incident light.

Multiple scattering: The scattering of light by a plurality of particles so that the light changes its direction of travel more than once.

Primary scattering The scattering of light off a single particle so that the direction of travel is changed only once.

Analyzer: A device, such as a polarizer prism, or a polarizing filter which can isolate the component in scattered light vibrating either parallel or perpendicular to the axis of the polarized light. A polarizer filter functions by absorbing the undesired light, while a polarizer prism refracts undersired light.

Detector: A device which is used in measuring the intensity of light transmitted from the analyzer. Photocells and photomultipliers are typical types of detectors.

Light: A form of radiant energy, which includes ultraviolet, visible, and infrared radiation.

What is claimed is:

1. Apparatus for use in detecting particles in a fluid sample, comprising: light source means for producing an incident beam of polarized light; detector means positioned on the same side of fluid sample as said light source for simultaneously detecting incident light which has been scattered backward by particles in said fluid and incident light which has scattered backward and has retained the original polarization.

2. Apparatus of claim 1, wherein said detector means includes a first analyzer means to selectively transmit light vibrating in substantially a plane parallel to the plane of the incident polarized light and first detecting means responsive to the light from said first analyzer means, and second analyzer means to selectively transmit light vibrating in substantially a single plane perpendicular to said the incident polarized light and second detecting means responsive to light from said second analyzer means, said first and said second detecting means being positioned to receive light backscattered at the same angle with respect to the direction of said incident light.

3. Apparatus of claim 1, further comprising means for comparing the ratio of the intensity of the light detected incident which has been scattered backward by particles in said fluid and depolarized, to the intensity of the detected incident light which has been scattered backward and retains the original polarization wherein said ratio is proportional to the concentration of said particles in said fluid.

4. The apparatus of claim 1, said detector means being positioned to receive light backscattered at a particular angle said angle being more than 150° from the direction of travel of said incident beam of polarized light.

5. The apparatus of claim 2, said detector means being positioned to receive light backscattered at a particular angle, said particular angle being more than 150° from the direction of travel of said incident beam of polarized light.

6. Apparatus for use in detecting particles in a fluid sample, comprising:
   a. source of incident light;
   b. polarizer means, for producing polarized incident light;
   c. first means selectively responsive only to incident light which is scattered in a backward direction by particles in a fluid and is depolarized;
   d. second means responsive to the total light which is scattered in said backward direction by particles in said fluid; said first means and said second means being positioned on the same side of said fluid sample as said source of incident light.

7. The apparatus of claim 6, said polarizer means, said first means, and said second means being in a plane which is defined by the direction of travel of said incident light and said light which is scattered in a backward direction, said plane being perpendicular to the plane of polarization of said polarized incident light, said backward direction being more than 150° from the direction of travel of said incident polarized light.

8. Apparatus for use in detecting particles in a fluid sample comprising:
   a. a source of incident light;
   b. polarizer means, for producing polarized incident light;
   c. first means and second means positioned on the same side of the fluid sample as said source of light so as to be responsive to light which is scattered in a predetermined backward direction;

d. said first means being selectively responsive only to polarized light and to depolarized light having a component vibrating in the same plane as said polarized light; and said second means being responsive to the total light which is scattered in said backward direction by particles in said fluid.

9. The apparatus of claim 8, said first means and said second means being positioned to receive light backscattered at a particular angle, said particular angle being more than 150° from the direction of travel of said incident beam of polarize light.

10. The apparatus of claim 8 said polarizer means and said first means and said second means being in a plane which is defined by the direction of travel of said incident light and said light which is backward scattered from said fluid, said plane being perpendicular to the plane of polarization of said polarized incident light said backward direction being more than 150° from the direction of travel of said incident polarized light.

11. Apparatus for use in detecting particles in a fluid sample comprising:
   a. light source means for producing incident polarized light;
   b. detecting means for detected independently detecting incident light which has been scattered in a backward direction by particles in said fluid sample and which retains its state of polarization and incident light which has been scattered in said backward direction by the particles in said fluid and has been depolarized said detecting means being positioned on the same side of the fluid sample as the light source such that said backward direction is at least 150°.

12. The apparatus of claim 11, wherein said detector means comprises means for selectively transmitting light vibrating in a plane parallel to the plane of the incident polarized light and light vibrating in a plane perpendicular to the plane of the incident polarized light, said light source means and said detector means being in a plane which is defined by the direction of travel of said polarized incident light and the direction of travel of said backward scattered light, said plane being substantially perpendicular to the plane of polarization of said polarized incident light.

13. The method of determining the concentration of particles suspended in a fluid medium, comprising the steps of:
   a. polarized light being directed toward the fluid being analyzed;
   b. measuring the intensity of light, scattered only in a particular backward direction from solid particles in said fluid, and having its optical axis parallel to that of step (a); and
   c. measuring the intensity of light scattered only in said particular backward direction, and having its optical axis normal to that of step (a),
whereby the degree of depolarization of the scattered light is represented by the ratio of the intensity of light of step (c) to that of step (b), and the particle concentration in the fluid is proportional to the degreee of depolarization.

14. Method of claim 13 wherein said particular backward direction is more than 150° from the direction of travel of polarized light of step (a).

15. The method of claim 13 wherein the polarized light of step (a) has a plane of polarization which is perpendicular to a plane which is designated by a direction of travel of the polarized light of step (a) and the light in step (b) scattered in said particular backward direction.

16. Method for detecting particles suspended in a fluid comprising:
   a. polarizing a beam of incident light;
   b. measuring the intensity of the incident light scattered only in a backward direction from particles in said fluid and which has been depolarized;
   c. measuring the intensity of the incident light scattering only in said backward direction from particles in said fluid and which retains its state of polarization;
   d. comparing the measured intensity of the polarized light with the measured intensity of the depolarized light.

17. The method of claim 16 wherein said particular backward direction is more than 150° from the direction of travel of the polarized light of step (a).

18. Apparatus for use in measuring the concentration of particles suspended in a fluid sample, comprising:
   a. light source means for producing polarized light and directing said light at the fluid;
   b. detectors positioned on the same side of said fluid sample as said light source for sequentially measuring the intensity of the incident light backscattered from the particles in said fluid and which has been depolarized and the incident light back scattered from said particles; and which retains its state of polarization; and
   c. means for comparing the measured intensity of the depolarized light to the measured intensity of the polarized light, wherein the concentration of the particles in the fluid is proportional to the ratio of the depolarized to the polarized light.

19. The apparatus of claim 18, said first means being positioned to receive light backscattered at a particular angle, said particular angle being more than 150° from the direction of travel of said incident beam of polarized light.

20. The apparatus of claim 18, wherein the polarized light of (a) has a plane of polarization which is perpendicular to an observation plane which is designated by a direction of travel of the polarized direction of travel of the light of (a) and the light backscattered from the particles in said fluid, said light source means and said detector means being in said observation plane..